United States Patent
Lei et al.

(10) Patent No.: US 11,366,220 B2
(45) Date of Patent: Jun. 21, 2022

(54) SPARSE ARRAY DESIGN FOR AUTOMOTIVE RADAR USING PARTICLE SWARM OPTIMIZATION

(71) Applicant: Baidu USA LLC, Sunnyvale, CA (US)

(72) Inventors: Lei Lei, Sunnyvale, CA (US); Davy Huang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 224 days.

(21) Appl. No.: 16/533,268

(22) Filed: Aug. 6, 2019

(65) Prior Publication Data
US 2021/0041557 A1    Feb. 11, 2021

(51) Int. Cl.
*G01S 13/931*   (2020.01)
*G06V 20/58*    (2022.01)
*G06F 17/14*    (2006.01)
*G05D 1/00*     (2006.01)

(52) U.S. Cl.
CPC .......... *G01S 13/931* (2013.01); *G05D 1/0088* (2013.01); *G06F 17/142* (2013.01); *G06V 20/58* (2022.01)

(58) Field of Classification Search
CPC ...... G06F 17/142; G06F 17/11; G01S 13/865; G01S 13/931; G01S 17/931; G01S 7/03; G01S 7/356; G05D 1/0088; G06K 9/00798; G06K 9/00805; G06K 9/00818
See application file for complete search history.

(56) References Cited

U.S. PATENT DOCUMENTS

| 5,537,367 A * | 7/1996 | Lockwood ............. G10K 11/34 342/372 |
| 9,912,055 B2 * | 3/2018 | Moon ................. H04B 17/3913 |
| 2011/0032173 A1 * | 2/2011 | Chang ..................... H01Q 3/40 343/880 |

OTHER PUBLICATIONS

Ullah et al. "Reduced side lobe level of sparse linear antenna array by optimized spacing and excitation amplitude using particle swarm optimization", 2017, IEEE, pp. 96-99. (Year: 2017).*
Li et al. "Unequally Spaced linear antenna arrays Synthesis Based on Genetic Algorithm", 2018, IEEE, pp. 1-4 (Year: 2018).*

* cited by examiner

*Primary Examiner* — Mohamed Charioui
(74) *Attorney, Agent, or Firm* — Womble Bond Dickinson (US) LLP

(57) ABSTRACT

A method is disclosed for designing a sparse array for an automotive radar. The method moves each of a number of antenna elements to candidate neighboring grid positions starting from an initial random seed placement to iteratively search for a placement of antenna elements that improves upon a cost function. The cost function for each candidate placement may be determined from characteristics of the FFT response associated with the candidate placement. The method may search for a candidate placement with the lowest cost function among the multiple candidate placements based on the random seed placement. The search may be repeated for a large number of random seed placements to find the candidate placement with the lowest cost function corresponding to each random seed placement. The method may compare the lowest cost functions corresponding to the multiple random seed placements to determine an optimized placement having the minimum cost function.

20 Claims, 10 Drawing Sheets

SPARSE ARRAY DESIGN FOR AUTOMOTIVE RADAR USING PARTICLE SWARM OPTIMIZATION

TECHNICAL FIELD

Embodiments of the present disclosure relate generally to operating autonomous vehicles. More particularly, embodiments of the disclosure relate to design of radars for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control operations depends heavily on the sensors of the vehicle. Sensors such as cameras, light detection and range (LIDAR) units, radars, etc., are used to capture video and electromagnetic images of environments around the vehicle for motion planning and control. For example, automotive radars send electromagnetic waves and receive the backscattering energy from targets on the road. The received radar data containing the energy from the reflected electromagnetic field, called radar raw data, may be processed using fast Fourier Transform (FFT) to extract the range, Doppler velocity and angle information of the targets. A radar may include an array of transmitting antenna elements or an array of receiving antenna elements. The size of the array of antenna elements as determined from the cumulative linear spacing between the antenna elements, called the array aperture, is inversely proportional to the beamwidth of the antenna beam. The larger the array aperture, the smaller the beamwidth and the finer the angle resolution of the antenna beam for discerning a target. Conventional uniform arrays have uniformly-spaced antenna elements. Thus, increasing the array aperture of a conventional uniform array may entail increasing the number of antenna elements, which disadvantageously increases the power, complexity, and cost of the array.

Alternatively, antennas containing non-uniformly spaced antenna elements, called sparse arrays, may be used for automotive radars as a way to increase the array aperture and thus achieve better angle resolution without concomitantly increasing the number of antenna elements. Existing methods for designing sparse arrays include methods for designing minimum hole arrays and minimum redundancy arrays. However, these design methods have limitations. For example, these design methods do not support the design of multiple-input multiple-output (MIMO) arrays. MIMO arrays, which include an array of transmitting antenna elements in addition to an array of receiving antenna elements, are becoming prevalent for automotive applications. It is desirable to have a design method to design sparse arrays of any size that is applicable to MIMO arrays as well as conventional sparse arrays for automotive radars.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
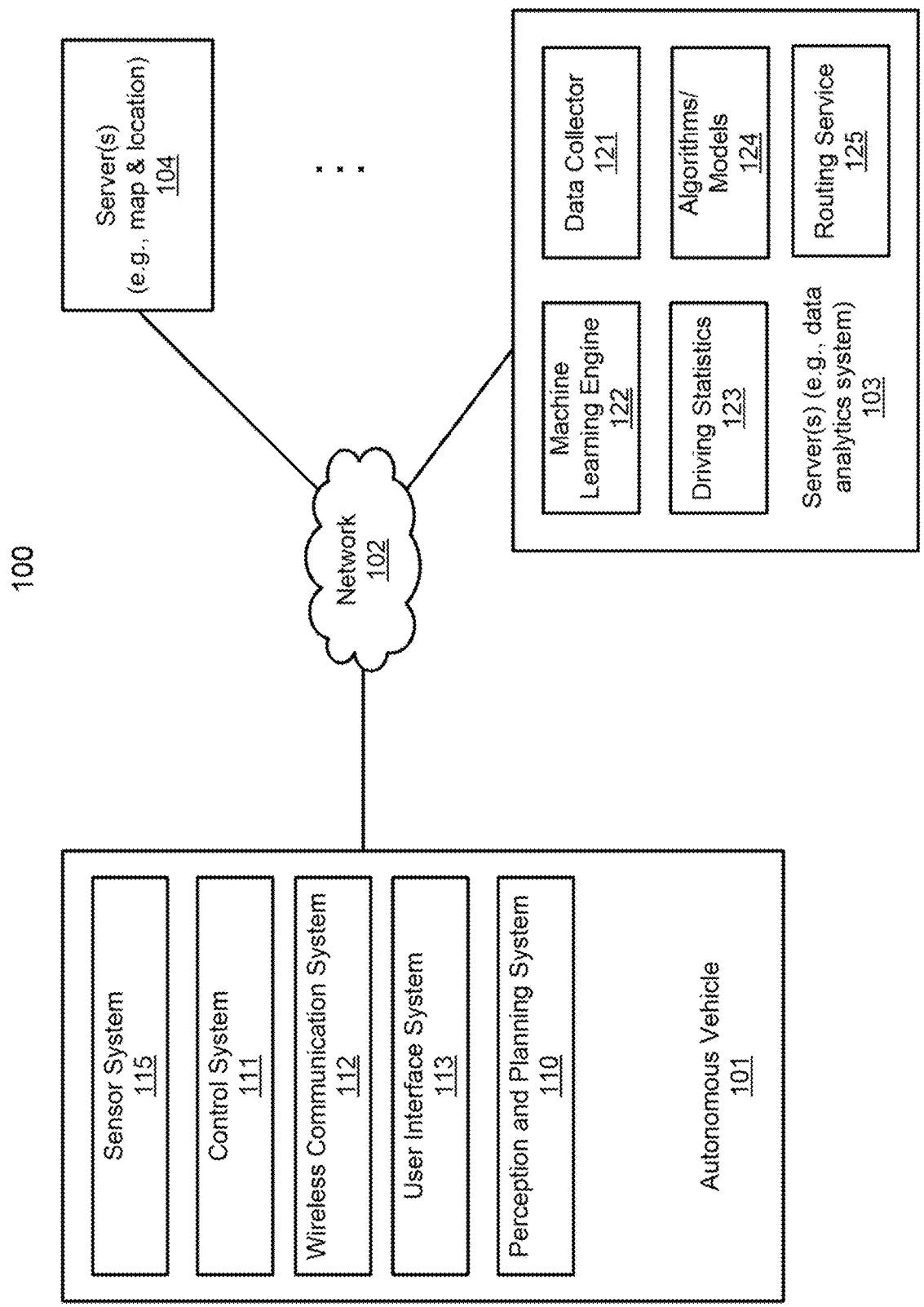
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is disclosed for designing a sparse array for an automotive radar of a specified array aperture and a specified number of antenna elements. The method, described as a particle swarm optimization method, moves each of a number of antenna elements to a range of candidate neighboring grid positions starting from an initial random seed placement to iteratively search for a placement of antenna elements that improves upon a cost function. The cost function for each candidate placement of antenna elements of the array may be determined from characteristics of the FFT response associated with the candidate placement. The method may search for a candidate placement with the lowest cost function among the multiple candidate placements based on the random seed placement. The search may be repeated for a large number of random seed placements to find the candidate placement with the lowest cost function corresponding to each of the multiple random seed placements. The method may compare the lowest cost functions corresponding to the multiple random seed placements to determine an optimized placement having the minimum cost function. The number of random seeds may be a function of the grid spacing of the antenna aperture, the number of antenna elements, and the computational power of the computer running the search. The particle swarm optimization method efficiently searches through the space of possible array placements to find a number of local optimal placements, and from the number of local optimal placements to find a global optimal placement. The method may be used to efficiently design MIMO arrays as well as conventional sparse arrays of an arbitrary array aperture and number of antenna elements for automotive radars.

In one embodiment, a computer-implemented method for designing a sparse array radar that includes a plurality of antenna elements is disclosed. The method includes generating multiple random seed placements of the antenna elements. The method also includes determining a respective initial cost function for each of the multiple random seed placements. The method further includes generating multiple candidate placements of the antenna elements from each of the multiple random seed placements. The method further includes determining a respective cost function for each of the multiple candidate placements generated from each of the multiple random seed placements. The method further iteratively updates each of the multiple random seed placements to a respective locally optimal placement. The locally optimal placement for a random seed placement is selected from the multiple candidate placements generated from the random seed placement if the locally optimal placement has a lower cost function than the initial cost function of the random seed placement. The method further includes selecting a final placement that has a minimum cost function from among the multiple locally optimal placements and any of the multiple random seed placements that do not have a corresponding locally optimal placement.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
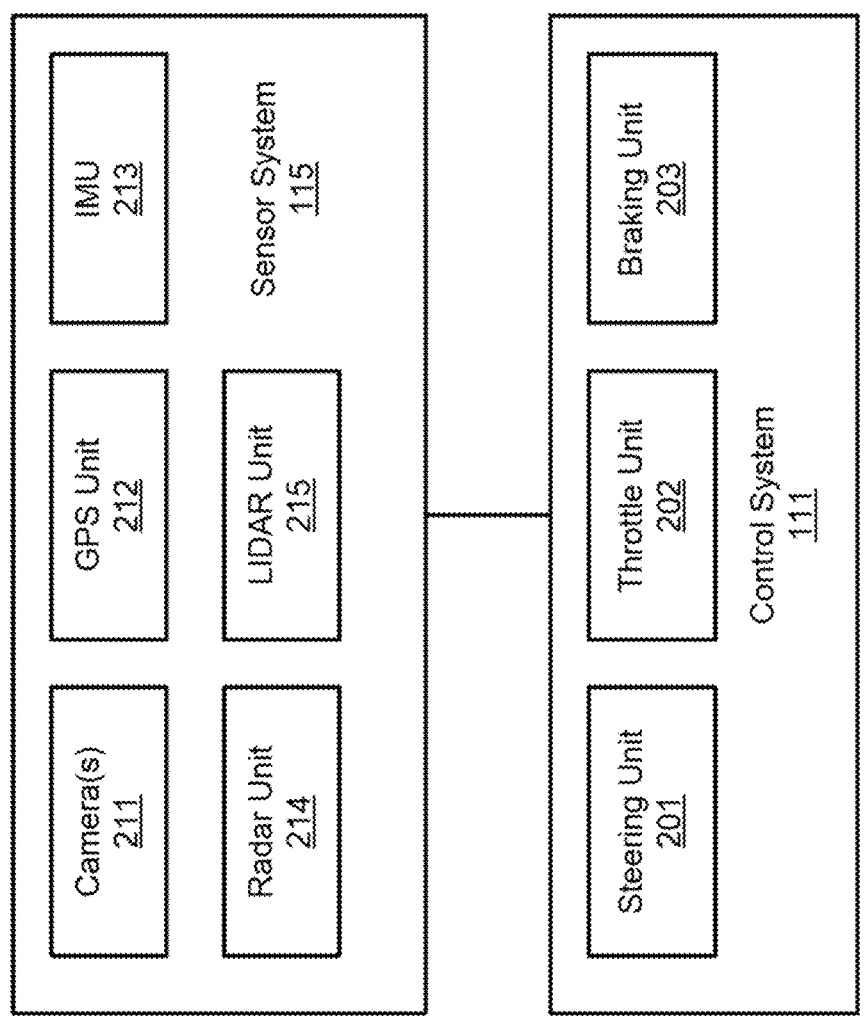
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may sense the speed, range, angle, and radar cross section of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
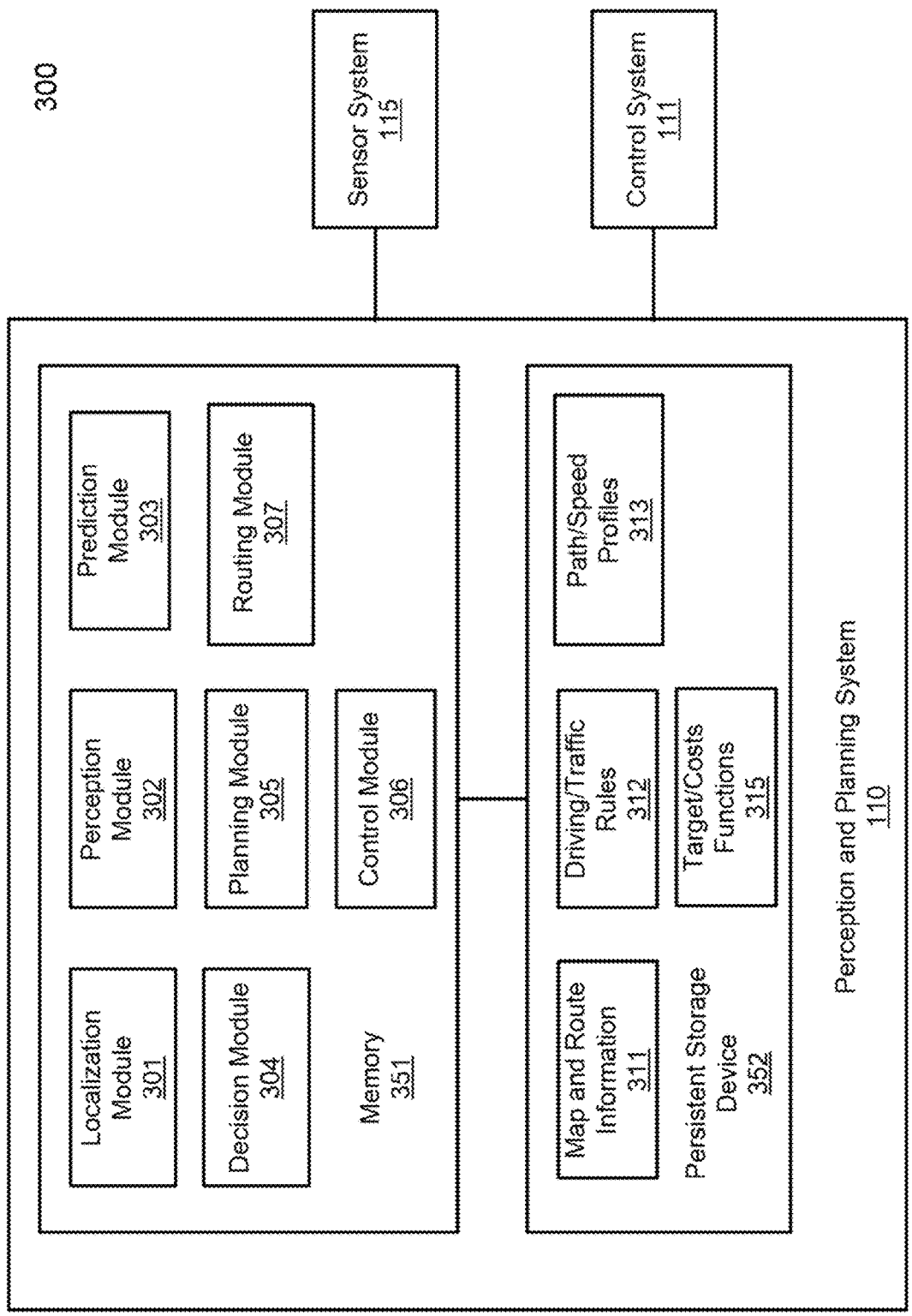
FIGS. 3A-3B are block diagrams illustrating examples of a perception and planning system used by an autonomous vehicle according to some embodiments.
Figure 3B:
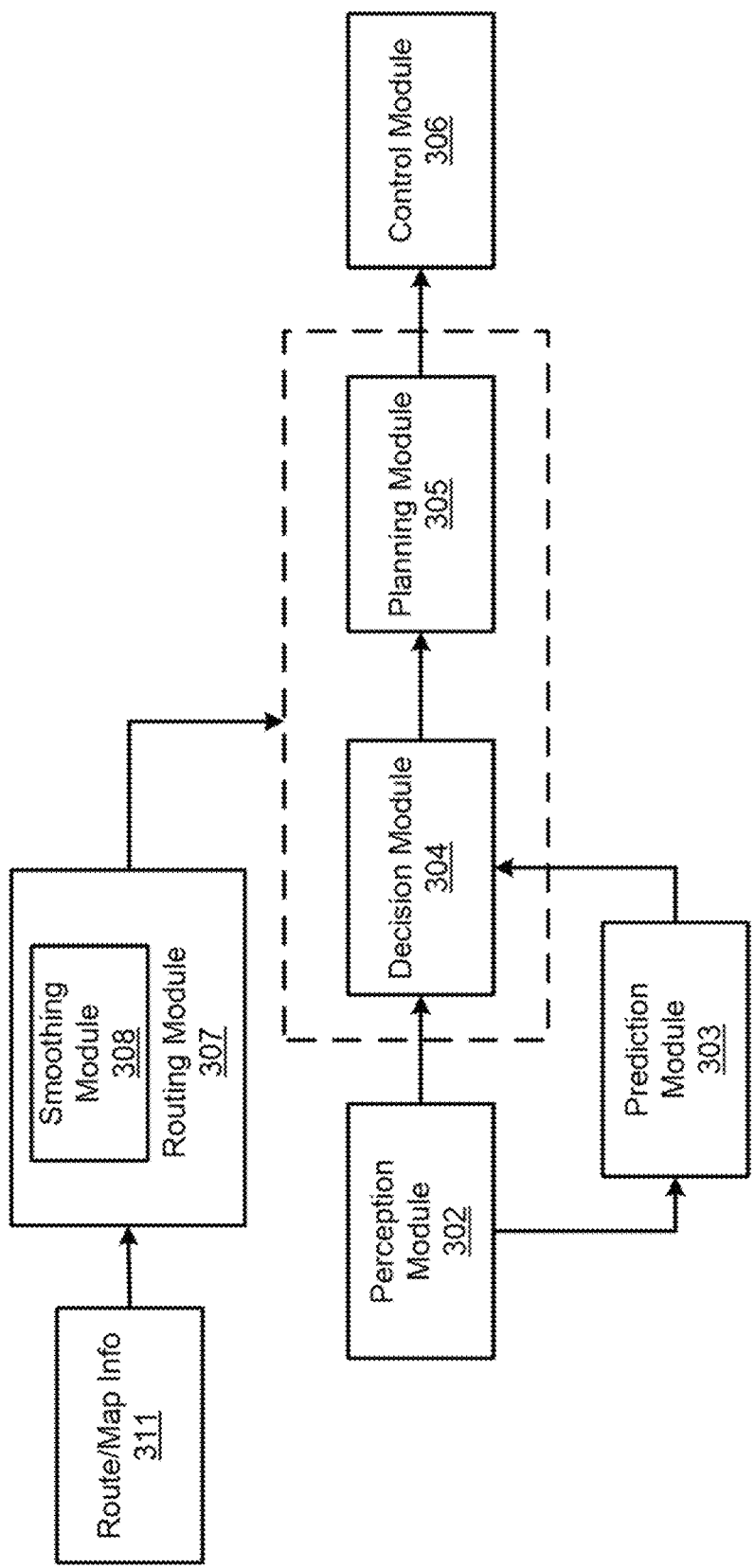

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

In one embodiment, decision module 304 generates a rough path profile based on a reference line provided by routing module 307 and based on obstacles and/or traffic information perceived by the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP).

In one embodiment, planning module 305 recalculates the rough speed profile using quadratic programming (QP) to optimize a speed cost function (as part of cost functions 315). Similar speed barrier constraints can be added to forbid the QP solver to search for some forbidden speeds.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
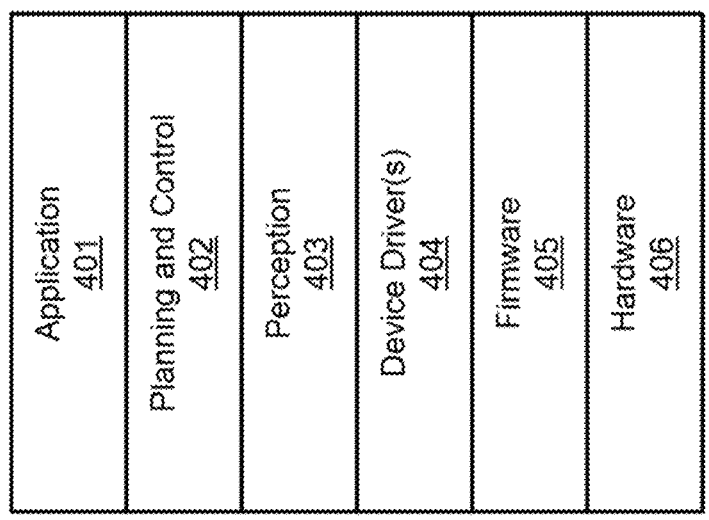
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
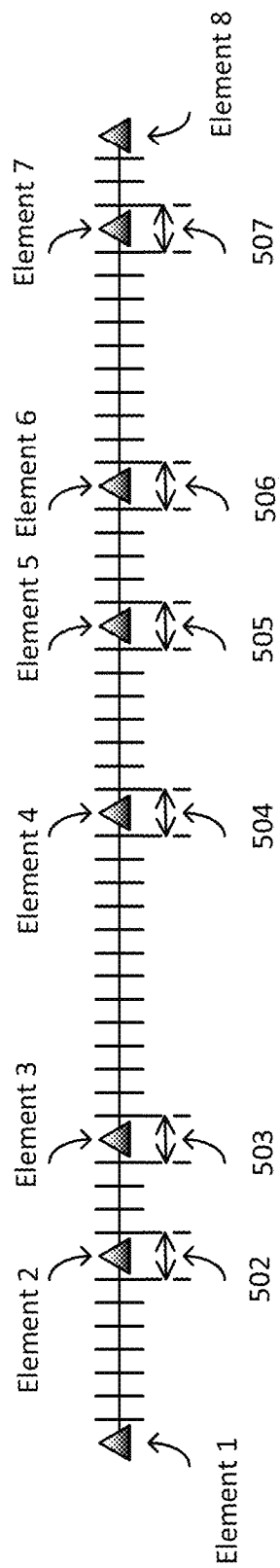
FIG. 5 is a diagram illustrating an initial random seed placement of antenna elements and the neighboring grid positions to which some of the antenna elements may be moved in a design method for a conventional sparse array according to one embodiment.

FIG. 5 is a diagram illustrating an initial random seed placement of antenna elements and the neighboring grid positions to which some of the antenna elements may be moved in a design method for a conventional sparse array according to one embodiment. The conventional sparse array may be used in the radar unit 214 of the sensor system 115. The design method, referred to as particle swarm optimization method, moves each of a number of antenna elements to a number of candidate neighboring grid positions starting from the initial random seed placement to iteratively search for a placement of antenna elements that improves upon the initial random seed placement using a cost function.

As the antenna aperture and the number of antenna elements of a sparse array increase to achieve better angle resolution afforded by a smaller beamwidth, the search for an optimal placement of the antenna elements becomes exponentially more burdensome. The goal of the design method is to find an optimal placement of the antenna elements to minimize the cost function in a computationally efficient manner. FIG. 5 illustrates the design method using an 1Tx by 8Rx conventional sparse array given an array aperture. In one embodiment, the array aperture may be determined based on the desired beamwidth or the desired angle resolution of the beam. Based on the array aperture, the linear distance between the two outermost antenna elements, denoted as element 1 and element 8, is determined. In one embodiment, the array aperture may be expressed in unit of the wavelength of the radar operating frequency, λ. For example, element 1 and element 8 may be placed M λ apart to yield the desired array aperture of M λ. The method searches for the placement of the remaining 6 antenna elements within the array aperture to minimize the cost function.

In one embodiment, the distance between element 1 and element 8, or the array aperture, may be divided into grids, where the grid spacing provides the spacing resolution for placing the remaining 6 antenna elements. The number of grids and the grid spacing may be a function of the computational capability of the system implementing the method. In one embodiment, the grid spacing may be 0.05-0.07λ. Using a random seed, the remaining 6 antenna elements are randomly placed on the grids, as shown by the initial placement of elements 2-7 in FIG. 5. Based on the initial placement of the 8 antenna elements, the method determines the direction of arrival FFT response of the antenna array. The method may process the FFT response across a range of azimuth angles of a target with respect to the array.

Figure 7:
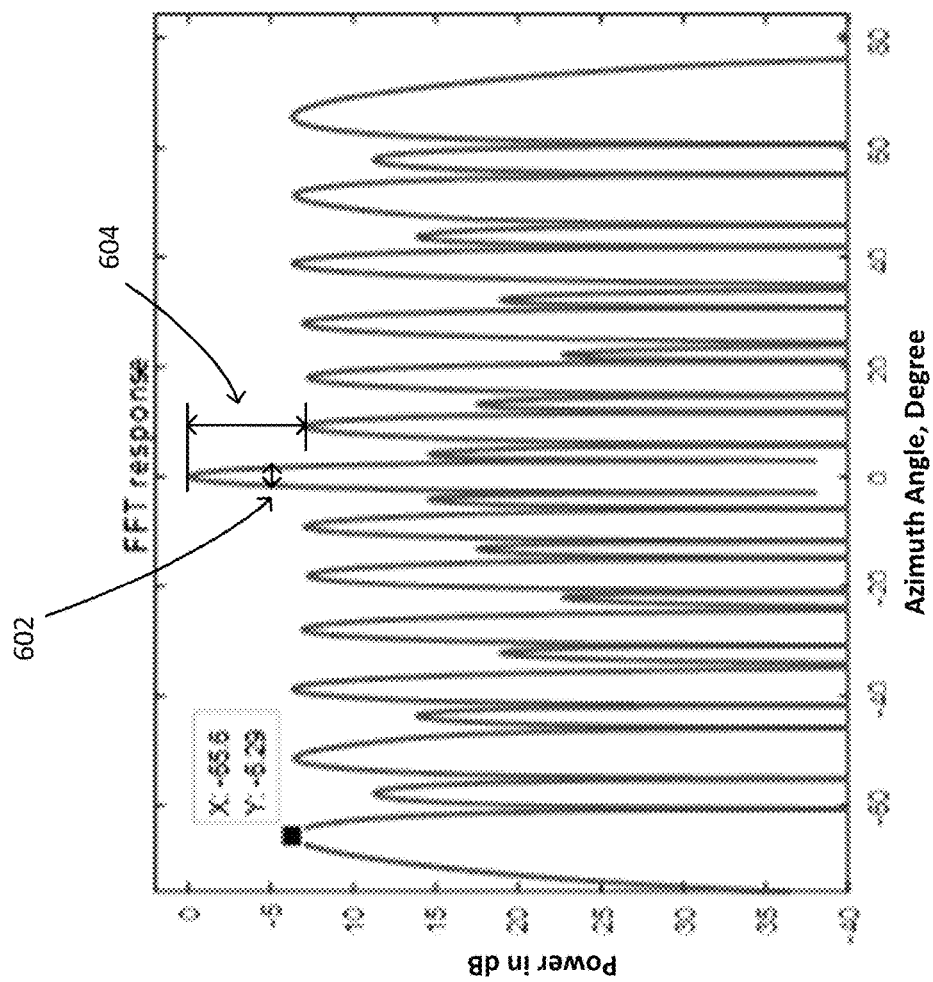
FIG. 7 is a sample FFT response as a function of azimuth angles for one placement of the antenna elements of a sample MIMO array for determining the cost function in a design method according to one embodiment.

FIG. 7 is a sample FFT response for a MIMO array to be discussed, but displays characteristics that are also pertinent to the FFT response for a conventional sparse array of FIG. 5. The FFT response shows the received power in dB across a range of azimuth angles. A main lobe centered at 0 degree is characterized by a 3-dB beamwidth 602. Side lobes lower in received power are shown on both sides of the main lobe with the peak power of the first side lobe down by a delta 604 from the peak power of the main lobe. To compare the FFT responses for various candidate placements of antenna elements of the array to find an optimal placement, a cost function may be defined. In one embodiment, the cost function may be a function of the 3-db beamwidth 602 of the main lobe and the power level of the side lobes. For example, the cost function may be:

$$\text{cost function} = \alpha \cdot SL + \beta \cdot BW$$

where α, β are weights and either one may be zero, SL may be the power of the maximum side lobe or the average power of all the side lobes, and BW is the 3-dB beamwidth 602 of the main lobe. The method seeks to optimize placement of the antenna elements by searching for the placement with the minimum cost function. In one embodiment, the cost function may use other measures of the beamwidth of the main lobe, such as the first null beamwidth, 6-dB beamwidth, etc.

Referring back to FIG. 5, the method may determine the initial cost function of the FFT response based on the random seed placement of the antenna elements. To search for candidate placements with a lower cost function, the method may move one of the 6 randomly placed antenna elements (i.e., one of elements 2-7) to grids in a neighboring region while keeping the locations of the other antenna elements the same. In one embodiment, the neighboring region may include the neighboring grids to the left and to the right of the antenna element. For example, element 2 may be moved to the grid on its immediate left and the grid on its immediate right denoted by the neighboring region 502 while keeping the other elements in their current locations. In one embodiment, the neighboring region may encompass more than one grid on each side of the element. In one embodiment, the neighboring region may be in two dimensions, e.g. in both the azimuth and elevation directions. For example, in addition to dividing the array aperture into grids along the azimuth x-direction as possible placement locations of the elements, grids may also be placed along the elevation y-direction. An element may be moved to a grid encompassed within a two-dimensional region surrounding the element.

The method may determine the FFT response of the array based on each candidate placement of moving element 2 in the neighboring region 502 while keeping the other elements fixed. The method may determine the cost function corresponding to the FFT response for each candidate placement. This operations of moving one element to grids in its neighboring region while keeping the other elements in their initial randomly placed locations, determining the FFT response based on each candidate placement, and determining the cost function corresponding to the FFT response is repeated for each of the 6 randomly placed antenna elements. For example, elements, 3, 4, 5, 6, and 7 may be moved to their respective left and right grids in neighboring regions 503, 504, 505, 506, and 507, respectively. There are 12 candidate placements of the elements (2 candidate movements per element times 6 elements) and 12 cost functions corresponding to the FFT responses based on the 12 candidate placements. The method may determine the minimum among the 12 cost functions and compare the minimum cost function of the candidate placements against the initial cost function corresponding to the initial random seed placement of the elements. If the minimum cost function is less than the initial cost function, the method updates the array placement to the candidate placement corresponding to the minimum cost function.

Starting from the updated array placement, the method may repeat the operations of moving one element to grids in its neighboring region while keeping the other elements in their current locations in the last updated array placement to obtain a number of candidate placements, determining the FFT response based on each candidate placement, determining the cost function corresponding to each FFT response, searching for the minimum cost function among the cost functions corresponding to the candidate placements, comparing the minimum cost function found against the cost function of the last updated array placement, and updating the array placement until the minimum cost function is not reduced further. When the minimum cost function of the candidate placements is not less than the cost function of the last updated array placement, the operations stop and the cost function of the last updated array placement is determined as the minimum cost function of the random seed placement. Thus, the method iteratively searches for a local optimum of the array placement starting from the initial random seed placement.

The method may generate a number of random seed placements of elements 2-7 and may perform the operations described to iteratively search for a local optimum of the array placement starting from each of the random seed placements. The method may compare the cost functions of the respective local optimums corresponding to each of the random seed placements to find the global minimum cost function. The array placement corresponding to the global minimum cost function may be determined as the optimal placement of the array elements. In one embodiment, the number of random seeds may be determined by the number of antenna elements, and the computational capability of the system implementing the method. In one embodiment, to reduce the computational burden of determining the FFT for each candidate placement, the method may use any redundancy spacing of the elements to filter out some of the candidate placements to calculate a subset of all possible candidate placements. In one embodiment, a candidate placement may include moving more than one element to their neighboring regions at the same time. For example, the method may move two elements to grids in their neighboring regions for each candidate placement. The number of candidate placements may increase as a result of a larger number of possible combinations of multiple elements to move compared to moving only one element for each candidate placement.

Figure 6A:
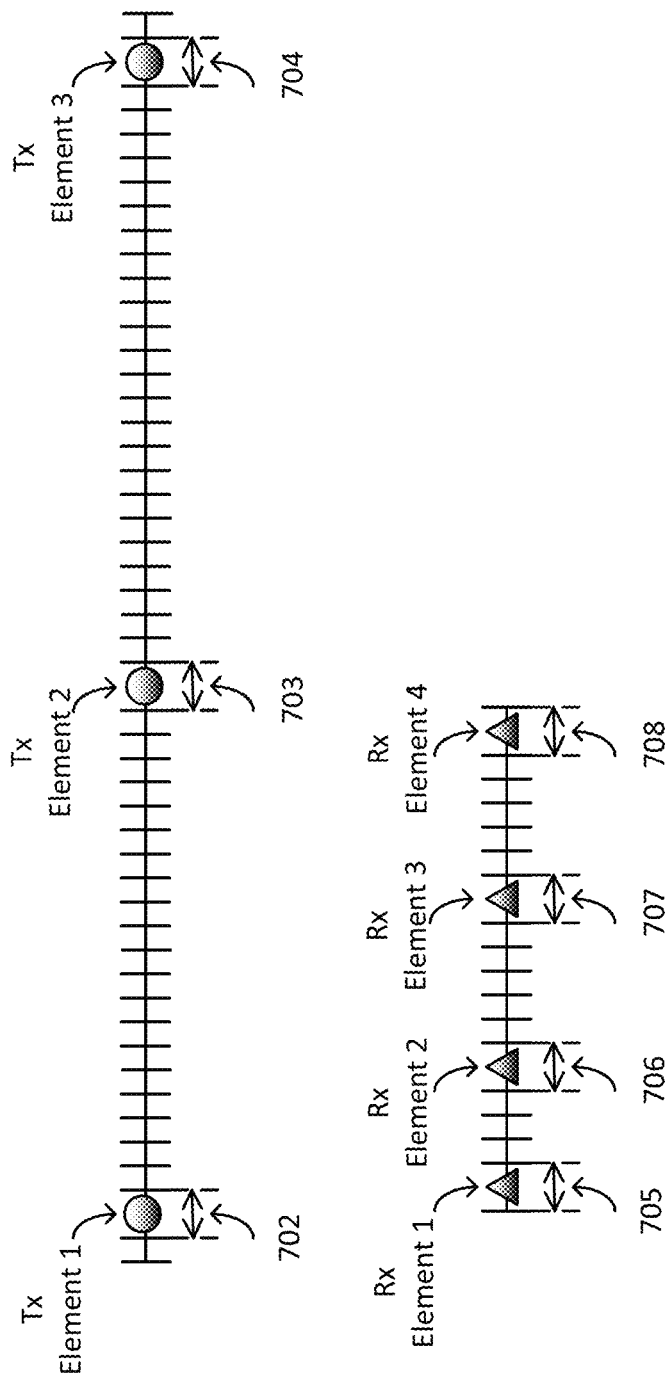
FIG. 6A is a diagram illustrating an initial seed placement of Tx antenna elements and Rx antenna elements and the neighboring grid positions to which each of the antenna elements may be moved in a design method for a MIMO array according to one embodiment.

FIG. 6A is a diagram illustrating an initial seed placement of Tx antenna elements and Rx antenna elements and the neighboring grid positions to which each of the antenna elements may be moved in a design method for a MIMO array according to one embodiment. The MIMO array has 3 Tx elements and 4 Rx elements. Each of the 3 Tx elements may transmit an electromagnetic field and the energy from the reflected electromagnetic fields from all 3 Tx elements may be received by the 4 Rx elements. While the 4 Rx elements are shown in this example as having an aperture less than the spacing between Tx element 1 and Tx element 2, there are no restrictions on the relative placement of the Tx and Rx elements as long as the effective aperture of the MIMO array is less than a maximum aperture. In one embodiment, the maximum aperture is $120\lambda$. The particle swarm optimization method may be applied to MIMO arrays of other geometries. Based on the relative geometry of the Tx and Rx elements, a virtual array may be determined based on the MIMO array to yield an effective array aperture.

Figure 6B:
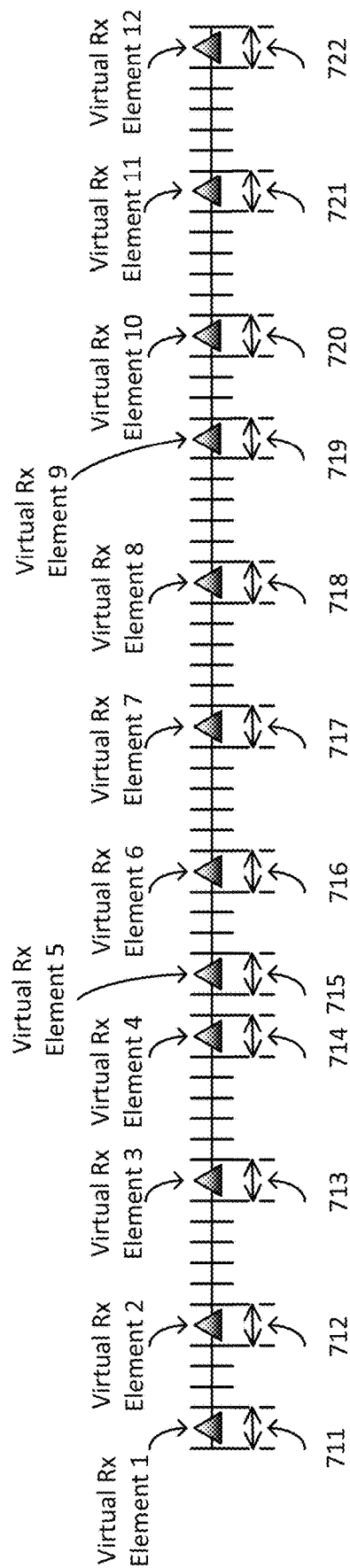
FIG. 6B is a virtual array of the MIMO array of FIG. 6A illustrating an initial seed placement of the virtual elements and the resulting movement of the virtual elements when the elements of the physical MIMO array of FIG. 6A are moved to their neighboring grid positions according to one embodiment.

FIG. 6B is a virtual array of the MIMO array of FIG. 6A illustrating an initial seed placement of the virtual elements and the resulting movement of the virtual elements when the elements of the physical MIMO array of FIG. 6A are moved to their neighboring grid positions according to one embodiment. The virtual array is a virtual representation of the MIMO array as a conventional 1Tx by N·Rx sparse array where N is the number of virtual Rx elements. It's considered a virtual representation because the received radar data of the N Rx elements from the 1 Tx element of the virtual array is effectively identical to the received radar data of the 4 Rx elements from the 3 Tx elements of the MIMO array. The relative placement of virtual Rx elements 1-4 is the same as the relative placement of the physical Rx elements 1-4 of the MIMO array of FIG. 6A. To obtain the placement of virtual Rx elements 5-8, virtual Rx elements 1-4 are shifted by the spacing between Tx element 1 and Tx element 2 of the MIMO array to account for the difference in the geometry from the physical Rx elements 1-4 to Tx element 1 and from Rx elements 1-4 to Tx element 2 of the MIMO array. Similarly, to obtain the placement of virtual Rx elements 9-12, virtual Rx elements 1-4 are shifted by the spacing between Tx element 1 and Tx element 3 of the MIMO array to account for the different in the geometry from the physical Rx elements 1-4 to the two Tx elements 2 and 3.

The virtual array as constructed has 12 virtual Rx elements 1-12 to yield an effective array aperture equivalent to the distance between virtual Rx element 1 and virtual Rx element 12. Note that the 7 physical elements (Tx elements 1-3 and Rx elements 1-4) of the MIMO array are now virtually represented as the 12 virtual Rx elements of the virtual array. The effective array aperture of the MIMO array is also larger than the spacing between any of the physical elements of the MIMO array. MIMO array thus has the advantage of achieving a desired array aperture and a desired array response using fewer elements and a more compact design than an equivalently performing conventional array.

Referring back to FIG. 6A, given a desired effective array aperture, the linear distance between the two outermost Tx elements (i.e., Tx elements 1 and 3) and the linear distance between the two outermost Rx elements (i.e., Rx elements 1 and 4) may be determined. For example, if the desired effective array aperture is $M\cdot\lambda$, the linear distance between the two outermost Tx elements may be $P\cdot\lambda$ and the linear distance between the two outermost Rx elements may be $Q\cdot\lambda$, such that $M\cdot\lambda=P\cdot\lambda+Q\cdot\lambda$ based on how the virtual array is constructed by shifting the Rx elements by the spacing between the Tx elements of the MIMO array as described. The $P\cdot\lambda$ spacing and the $Q\cdot\lambda$ spacing may be divided into grids, where the grid spacing provides the spacing resolution for placing the Tx elements and Rx elements. The method searches for the placement of the Tx elements and Rx elements to minimize the cost function.

In one embodiment, using a random seed, the Tx elements 1-3 are randomly placed on the grids for the Tx elements and the Rx elements 1-4 are randomly placed on the grids for the Rx elements. The method may determine the FFT response of the MIMO array based on the initial random seed placement and may determine the initial cost function from the FFT response. To search for candidate placements with a lower cost function than the initial cost function, the method may move one of Tx element 1, 2, or 3 or one of Rx elements 1, 2, 3, or 4 to grids in their respective neighboring regions 702, 703, 704, 705, 706, 707, and 708 while keeping the placements of the other elements the same. In this embodiment, any of the elements may be moved to grids in its neighboring region to search for candidate placements, in contrast to the conventional array of FIG. 5 where the placement of the two outermost Rx elements remain fixed through the search. The neighboring region may encompass one or more grids on either side of the element in one or more dimensions, such as in both the azimuth and elevation directions. Moving a physical Tx element or Rx element of the MIMO array to grids to its neighboring region may be equivalent to moving one or more virtual Rx elements 1-12 to grids in their neighboring regions 711-722 as shown in FIG. 6B.

FIG. 7 is a sample FFT response as a function of azimuth angles for one placement of the antenna elements of a sample MIMO array for determining the cost function in a design method according to one embodiment. As described, a main lobe centered at 0 degree is characterized by a 3-dB beamwidth 602 and a first side lobe is down by a delta 604 from the peak power of the main lobe. In one embodiment, the cost function may be a function of the 3-db beamwidth 602 of the main lobe and the power level of the side lobes. In one embodiment, the cost function may use other measures of the beamwidth of the main lobe, such as the first null beamwidth, 6-dB beamwidth, etc.

The method may determine the FFT response and the cost function of each candidate placement. The method may determine the minimum among the cost functions corresponding to the candidate placements and may update the array placement to the candidate placement corresponding to the minimum cost function if the minimum cost function is lower than the initial cost function corresponding to the initial random seed placement. Starting from the updated array placement, the method may iteratively search for a local optimum of the array placement starting from the initial random seed placement by repeating the operations of moving one element to grids in its neighboring region while keeping the other elements in their current locations in the last updated array placement to obtain a number of candidate placements, determining the FFT response based on each candidate placement, determining the cost function corresponding to each FFT response, searching for the minimum cost function among the cost functions corresponding to the candidate placements, comparing the minimum cost function found against the cost function of the last updated array placement, and updating the array placement until the minimum cost function is not reduced further.

The method may generate a number of random seed placements of Tx elements 1-3 and Rx elements 1-4 to iteratively search for a local optimum of the array placement starting from each of the random seed placements. The method may compare the cost functions of the respective local optimums corresponding to each of the random seed placements to find the global minimum cost function. The array placement corresponding to the global minimum cost function may be determined as the optimal placement of the Tx and Rx elements for the MIMO array.

Figure 8:
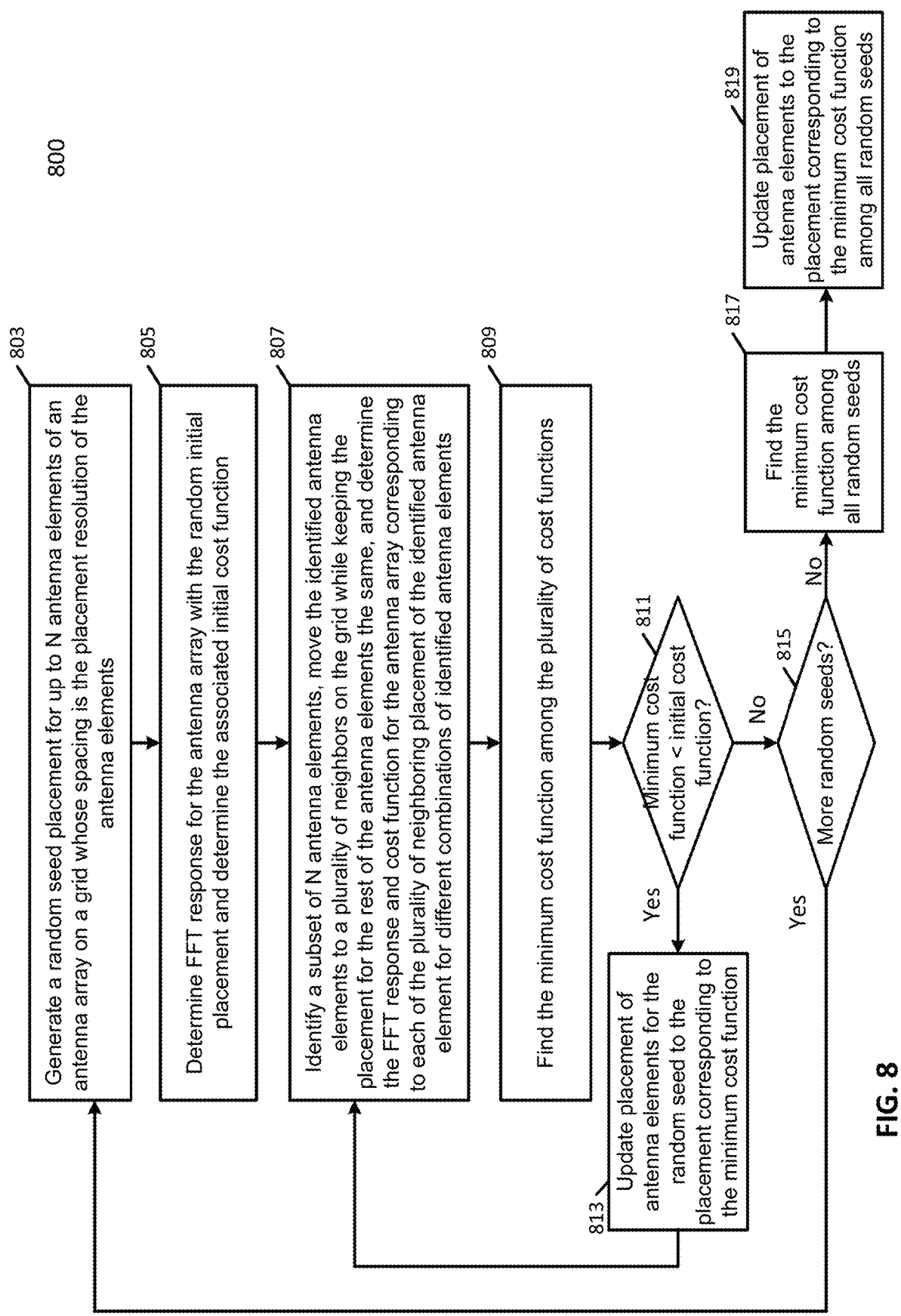
FIG. 8 is a flow diagram illustrating a method of designing a sparse array using a particle swarm optimization method according to one embodiment.

FIG. 8 is a flow diagram illustrating a method of designing a sparse array using a particle swarm optimization method according to one embodiment. The particle swarm optimization method 800 may be performed by processing logic which may include software, hardware, or a combination thereof. For example, the particle swarm optimization method 800 may be performed by the radar unit 214 of the sensor system 115 of FIG. 2. The particle swarm optimization method 800 is applicable for designing both conventional and MIMO sparse arrays.

At block 803, the method generates a random seed placement for up to N antenna elements on a grid whose spacing provides the spacing resolution for placing the antenna elements of an antenna array. The method may determine the aperture size of the antenna array and the number of antenna elements of the antenna array. In one embodiment, the array aperture may be determined based on the desired beamwidth or the desired angle resolution of the antenna beam. For example, based on the array aperture, the linear distance between the two outermost Tx antenna elements or the two outermost Rx antenna elements may be determined. The number of antenna elements may be determined based on a tradeoff between the performance, power, and cost of the array. In one embodiment, the N randomly placed antenna elements may exclude the two outermost Rx antenna elements of a conventional array used to determine the array aperture. In one embodiment, the N randomly placed antenna elements may include all the Tx and Rx elements of a MIMO array.

At block 805, the method determines the FFT response for the antenna array with the random initial placement and determines the initial cost function associated with the FFT response. The method may determine the response of the Rx elements of the antenna array to electromagnetic fields from one or more Tx elements. The method may process the response using FFT to generate the FFT response across a range of azimuth angles of a target with respect to the array. The cost function is used as metrics to compare the FFT response from different candidate placements to find an optimal placement. In one embodiment, the cost function may be a function of the 3-db beamwidth of the main lobe and the power level of the side lobes.

At block 807, the method identifies one or more of the N randomly placed antenna elements, and moves the identified antenna elements to grids in their neighboring region while keeping the placement of the other antenna elements the same to generate a number of candidate placements. The method identifies different combinations of the N randomly placed antenna elements and generates the group of candidate placements for each of the combinations identified. The method determines the FFT response of the array based on each candidate placement and the cost function associated with the FFT response.

At block 809, the method finds the minimum cost function among the cost functions corresponding to the candidate placements. The candidate placements include the group of candidate placements for each of the different combinations of the N randomly placed antennas elements identified.

At block 811, the method compares the minimum cost function among the candidate placements with the initial cost function. If the minimum cost function is less than the initial cost function, the method updates the array placement to the candidate placement corresponding to the minimum cost function and updates the initial cost function to the minimum cost function at block 813. The method returns to block 807 to identify different combinations of a subset of the N antenna elements to move for the next iteration of the candidate placements and to determine if the minimum cost function for the next iteration of candidate placements is less than the cost function of the last updated array placement.

At block 815, if the minimum cost function among the candidate placements is not less than the initial cost function, a local optimum of the array placement starting from the initial random seed placement has been found. The method determines whether there are more random seed placements of the N antenna elements to generate.

If there are more random seed placements to generate, the method returns to block 803 to generate the next random seed placement for the N antenna elements. The method may repeat blocks 805, 807, 809, 811, and 813 to determine the cost function corresponding to the local optimum of the array placement starting from each of the random seed placements. In one embodiment, the number of random seeds may be determined by the number of antenna elements, and the computational capability of the system implementing the method.

At block 817, if there are no more random seed placements to generate, the method compares the cost functions of the respective local optimums corresponding to each of the random seed placements to find the global minimum cost function.

At block 819, the method updates the array placement to the placement corresponding to the global minimum cost function. The final array placement represents the best array placement among all the candidate placements evaluated.

A data processing system may perform any of the processes or methods described above, such as, for example, the particle swarm optimization method to search for an optimal placement of the elements of an antenna array. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more generalpurpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for designing a sparse array radar for an autonomous driving vehicle (ADV), the method comprising:
   determining, for each of a plurality of random seed placements of antenna elements of the sparse array radar for the ADV, a respective initial cost function;
   generating, from each of the plurality of random seed placements, a plurality of candidate placements of the antenna elements;
   determining, for each of the plurality of candidate placements, a respective cost function;
   updating iteratively, for each of the plurality of random seed placements, its random seed placement to a locally optimal placement selected from the candidate placements generated from the respective random seed placement when the locally optimal placement has a lower cost function than the initial cost function of the respective random seed placement; and
   selecting a final candidate placement that has a minimum cost function from among the plurality of locally optimal placements and any of the plurality of random seed placements that do not have corresponding locally optimal placements.

2. The method of claim 1, further comprising determining an array aperture of the sparse array radar, wherein the array aperture determines a placement of two outermost antenna elements of the sparse array radar.

3. The method of claim 1, wherein determining, for each of the plurality of random seed placements, a respective initial cost function comprises:
   determining, for each of the plurality of random seed placements, a fast Fourier Transform (FFT) response; and
   determining the respective initial cost function based on a main lobe beamwidth and a power level of one or more side lobes of the FFT response.

4. The method of claim 1, wherein determining, for each of the plurality of candidate placements, a respective cost function comprises:
   determining, for each of the plurality of candidate placements, a candidate FFT response; and
   determining the respective cost function based on a main lobe beamwidth and a power level of one or more side lobes of the candidate FFT response.

5. The method of claim 1, wherein generating, from each of a plurality of random seed placements, a plurality of candidate placements of the antenna elements comprises:
   moving, for each of the plurality of random seed placements, one or more of the antenna elements to a plurality of neighboring locations while keeping in place remaining antenna elements; and selecting a plurality of combinations of the one or more antenna elements for moving to generate the plurality of candidate placements of the antenna elements.

6. The method of claim 5, wherein the plurality of neighboring locations are encompassed within a neighboring region surrounding the one or more antenna elements selected for moving, wherein the neighboring region comprises one or more dimensions of an azimuth and an elevation.

7. The method of claim 1, wherein updating iteratively, for each of the plurality of random seed placements, its random seed placement to a locally optimal placement comprises:

searching, for each of the plurality of random seed placements, a minimum cost function among the cost functions of the plurality of candidate placements generated from the respective random seed placement;

comparing the minimum cost function with the initial cost function of the respective random seed placement; and updating the initial cost function of the respective random seed placement to the minimum cost function when the minimum cost function is lower than the initial cost function of the respective random seed placement.

8. The method of claim 7, further comprising:

updating the respective random seed placement to the candidate placement corresponding to the minimum cost function as the locally optimal placement when the minimum cost function is lower than the initial cost function of the respective random seed placement; and retaining the respective random seed placement and the initial cost function of the respective random seed placement when the minimum cost function is not lower than the initial cost function of the respective random seed placement.

9. The method of claim 8, further comprising:

generating, from each of the plurality of locally optimal placements, a plurality of candidate placements of the antenna elements;

determining, for each of the plurality of candidate placements generated from each of the plurality of locally optimal placements, a respective cost function; and updating, for each of the plurality of locally optimal placements, the locally optimal placement to a placement selected from the plurality of candidate placements generated from the respective locally optimal placement when the selected placement has a lower cost function than the cost function of the respective locally optimal placement.

10. A non-transitory machine-readable medium having instructions stored therein, which when executed by a processor, cause the processor to perform operations for designing a sparse array radar for an autonomous driving vehicle (ADV), the operations comprising:

determining, for each of a plurality of random seed placements of antenna elements of the sparse array radar, a respective initial cost function;

generating, from each of the plurality of random seed placements, a plurality of candidate placements of the antenna elements;

determining, for each of the plurality of candidate placements, a respective cost function;

updating iteratively, for each of the plurality of random seed placements, its random seed placement to a locally optimal placement selected from the candidate placements generated from the respective random seed placement when the locally optimal placement has a lower cost function than the initial cost function of the respective random seed placement; and selecting a final candidate placement that has a minimum cost function from among the plurality of locally optimal placements and any of the plurality of random seed placements that do not have corresponding locally optimal placements.

11. The non-transitory machine-readable medium of claim 10, wherein the operations further comprise determining an array aperture of the sparse array radar, wherein the array aperture determines a placement of two outermost antenna elements of the sparse array radar.

12. The non-transitory machine-readable medium of claim 10, wherein determining, for each of the plurality of random seed placements, a respective initial cost function comprises:

determining, for each of the plurality of random seed placements, a fast Fourier Transform (FFT) response; and determining the respective initial cost function based on a main lobe beamwidth and a power level of one or more side lobes of the FFT response.

13. The non-transitory machine-readable medium of claim 10, wherein determining, for each of the plurality of candidate placements, a respective cost function comprises:

determining, for each of the plurality of candidate placements, a candidate FFT response; and determining the respective cost function based on a main lobe beamwidth and a power level of one or more side lobes of the candidate FFT response.

14. The non-transitory machine-readable medium of claim 10, wherein generating, from each of a plurality of random seed placements, a plurality of candidate placements of the antenna elements comprises:

moving, for each of the plurality of random seed placements, one or more of the antenna elements to a plurality of neighboring locations while keeping in place remaining antenna elements; and selecting a plurality of combinations of the one or more antenna elements for moving to generate the plurality of candidate placements of the antenna elements.

15. The non-transitory machine-readable medium of claim 14, wherein the plurality of neighboring locations are encompassed within a neighboring region surrounding the one or more antenna elements selected for moving, wherein the neighboring region comprises one or more dimensions of an azimuth and an elevation.

16. The non-transitory machine-readable medium of claim 10, wherein updating iteratively, for each of the plurality of random seed placements, its random seed placement to a locally optimal placement comprises:

searching, for each of the plurality of random seed placements, a minimum cost function among the cost functions of the plurality of candidate placements generated from the respective random seed placement;

comparing the minimum cost function with the initial cost function of the respective random seed placement; and updating the initial cost function of the respective random seed placement to the minimum cost function when the minimum cost function is lower than the initial cost function of the respective random seed placement.

17. The non-transitory machine-readable medium of claim 16, wherein the operations further comprise:

updating the respective random seed placement to the candidate placement corresponding to the minimum cost function as the locally optimal placement when the minimum cost function is lower than the initial cost function of the respective random seed placement; and retaining the respective random seed placement and the initial cost function of the respective random seed placement when the minimum cost function is not lower than the initial cost function of the respective random seed placement.

18. The non-transitory machine-readable medium of claim 17, wherein the operations further comprise:

generating, from each of the plurality of locally optimal placements, a plurality of candidate placements of the antenna elements;

determining, for each of the plurality of candidate placements generated from each of the plurality of locally optimal placements, a respective cost function; and updating, for each of the plurality of locally optimal placements, the locally optimal placement to a placement selected from the plurality of candidate placements generated from the respective locally optimal placement when the selected placement has a lower cost function than the cost function of the respective locally optimal placement.

19. A data processing system, comprising:

a processor;

a memory coupled to the processor to store instructions, which when executed by the processor, cause the processor to perform operations for designing a sparse array radar for an autonomous driving vehicle (ADV), the operations comprising:

determining, for each of a plurality of random seed placements of antenna elements of the sparse array radar of the ADV, a respective initial cost function, generating, from each of the plurality of random seed placements, a plurality of candidate placements of the antenna elements, determining, for each of the plurality of candidate placements, a respective cost function, updating iteratively, for each of the plurality of random seed placements, its random seed placement to a locally optimal placement selected from the candidate placements generated from the respective random seed placement when the locally optimal placement has a lower cost function than the initial cost function of the respective random seed placement, and selecting a final candidate placement that has a minimum cost function from among the plurality of locally optimal placements and any of the plurality of random seed placements that do not have corresponding locally optimal placements.

20. The system of claim 19, wherein the operations further comprise determining an array aperture of the sparse array radar, wherein the array aperture determines a placement of two outermost antenna elements of the sparse array radar.

* * * * *